Patented Sept. 21, 1943

2,329,936

UNITED STATES PATENT OFFICE 2,329,936

METHOD OF DETERMINING THE MATURITY OF CORN

Robert E. Oltman, Le Sueur, Minn., assignor to Minnesota Valley Canning Company, Le Sueur, Minn., a corporation of Minnesota No Drawing. Application October 11, 1941, Serial No. 414,689

5 Claims. (Cl. 88—14)

This invention relates to a method of determining the maturity of corn, and more specifically to a method of classifying corn according to its maturity by the refractive index of the juice expressed from the corn.

It is, of course, known that maturity is related to the moisture, sugar, starch and alcohol insoluble matter in corn; but these factors are not reliable, however, as maturity criteria. The practice in the canning industry has been to evaluate the maturity of corn by determining its moisture content in the Brown-Duvel moisture apparatus. In brief, this process requires the distillation of the moisture in the corn to be tested, and the distilled water is collected in a graduated cylinder. From the quantity of water distilled, and the weight of the corn sample taken, the moisture percentage may be calculated. This method requires about forty minutes per determination which is too time-consuming and in addition it is not sufficiently reliable.

Heretofore, it has not been known that the sugar-starch ratio in corn is another and superior test of maturity; and that the refractive index of the juice expressed from the corn correlates with this ratio and is a superior criterion of maturity. Moreover, the quality of the corn is a direct function of the sugar-starch ratio, and an indirect or inverse function of the refractive index of the juice in the corn. A relatively high refractive index would indicate a more mature corn of low quality and low sugar-starch ratio. A relatively high sugar-starch ratio would indicate lower maturity and higher quality and a low refractive index.

One object of this invention is to provide a method of determining the maturity of corn that overcomes the difficulties of the prior art.

Another object is to provide a method to determine the maturity of corn from the refractive index of juice expressed from it.

Yet another object of the present invention is to correlate the sugar-starch ratio in corn with its maturity.

Still another object of this invention is to correlate the refractive index of the juice in corn with its sugar-starch ratio.

To accomplish the foregoing and other objects, the invention comprises expressing the juice from corn kernels, determining its refractive index in a suitable refractometer, and knowing that the refractive index correlates with the sugar-starch ratio, thereby estimating the maturity of the corn from the index.

During a test run, the refractive indices of samples of corn were determined side by side and on the same sample on which the regular Brown-Duvel test was made along with analysis of the alcohol insoluble solids and the sugar content. The properly sampled kernels were chopped with a food chopper in a dry pan and the sample for the Brown-Duvel check was taken. A sample for the refractive index determination was obtained from this same pan by absorbing in a piece of cotton the juice expressed from the corn by the chopping action. The juice was squeezed from the cotton and the refractive index of the expressed juice was determined in a suitable refractometer.

The data given below is illustrative of the results obtained. This specific data shows the refractive index, Brown-Duvel moisture, alcohol insoluble solids, sugar, starch and sugar-starch ratio in a hybrid yellow sweet corn at various maturities.

| Code 10 | Refractive index | Brown-Duvel moisture | Sugar | Starch | A. I. S. | Sugar Starch ratio |
|---|---|---|---|---|---|---|
| Normal: | | Per cent | Per cent | Per cent | Per cent | |
| 1 | 1.3697 | 75 | 4.03 | 12.4 | 18.2 | .31 |
| 2 | 1.3692 | 75 | 3.79 | 12.2 | 17.3 | .31 |
| 3 | 1.3791 | 70 | 3.94 | 17.2 | 23.8 | .23 |
| 4 | 1.3786 | 70 | 4.03 | 17.6 | 24.3 | .23 |
| 5 | 1.3839 | 65 | 2.86 | 21.2 | 28.2 | .14 |
| 6 | 1.3839 | 65 | 3.01 | 20.7 | 30.3 | .14 |
| Abnormal: | | | | | | |
| 7 | 1.3727 | 75 | 4.95 | 14.2 | 19.8 | .35 |
| 8 | 1.3722 | 75 | 3.79 | 13.8 | 19.3 | .27 |
| 9 | 1.3717 | 75 | 3.65 | 12.6 | 18.8 | .27 |
| 10 | 1.3867 | 70 | 3.62 | 21.7 | 29.6 | .17 |
| 11 | 1.3766 | 70 | 4.86 | 17.2 | 23.8 | .28 |
| 12 | 1.3742 | 70 | 3.00 | 16.6 | 23.0 | .18 |
| 13 | 1.3820 | 65 | 3.65 | 22.2 | 27.8 | .18 |
| 14 | 1.3820 | 65 | 3.91 | 20.1 | 27.5 | .19 |
| 15 | 1.3820 | 65 | 3.52 | 20.0 | 27.4 | .18 |

The starch was calculated empirically from the prediction equation:

% starch = $1.09 + .77$ (% alcohol insoluble solids)

The refractive index is accurate to within $\pm 0.0005$.

The abnormal values are segregated because the sugar-starch ratio is either higher or lower than should be expected from the Brown-Duvel moisture test.

Referring to Nos. 7, 8, 9, it will be seen that the refractive indices are higher than for Nos. 1 and 2, yet the Brown-Duvel moistures of all are identical. No. 7 shows a higher refractive index than No. 1 and a higher sugar-starch ratio. According to both refractive index and sugar-starch ratios, Nos. 8 and 9 are not properly placed at 75% moisture, but rather intermediate between 75% and 70%. No. 11 with a sugar-starch ratio of 0.28 is far out of line at 70% moisture. By reason of its refractive index and its sugar-starch ratio, it is much less mature than its moisture content of 70% serves to indicate. Furthermore, this same sample (No. 11) shows the same starch content (17.2%) and the same alcohol insoluble matter (23.8%) as No. 3, but has a higher sugar-starch ratio due to a higher sugar content. No. 11 yields a better quality canned corn than No. 3.

Nos. 10 and 12 are of greater maturity and lower quality than their moisture content of 70% alone indicates; and Nos. 13, 14 and 15 are of lesser maturity and hence higher quality than their moisture content of 65% would indicate.

From the above data, it will be appreciated that the sugar-starch ratio and the refractive index, which, as mentioned, is a result of this ratio, provides an easier, more reliable and faster method for classifying corn according to maturity, and as a consequence, quality. The test is a real advance over the Brown-Duvel determination and is clearly more accurate.

I claim:

1. A method of determining the maturity of corn comprising measuring the refractive index of juice of said corn and correlating from the refractive index the maturity of the corn.

2. A method of determining the maturity of corn comprising measuring the refractive index of juice of said corn and correlating from the refractive index the sugar-starch content ratio in the juice which is an indication of the maturity of the corn.

3. A method of determining the sugar-starch ratio of corn comprising measuring the refractive index of juice of said corn and correlating from the refractive index the sugar-starch ratio.

4. A method of determining the maturity of corn comprising expressing juice from the corn, measuring the refractive index of said juice and correlating from the refractive index the maturity of the corn.

5. A method of determining the maturity of corn comprising breaking sample kernels of corn, collecting a sample of juice from the broken kernels and correlating from the refractive index of the juice the maturity of the corn.

ROBERT E. OLTMAN.